Patented Feb. 3, 1953

2,627,476

UNITED STATES PATENT OFFICE 2,627,476

MAGNESIUM OXYCHLORIDE CEMENT MANUFACTURE

Lyle K. Herndon, Columbus, Ohio, assignor to Mathieson Chemical Corporation, a corporation of Virginia No Drawing. Application November 7, 1950, Serial No. 194,564

6 Claims. (Cl. 106—106)

My invention relates to a process for the manufacture of so-called magnesium oxychloride cements and more particularly to unitary magnesium oxychloride cement compositions which require only the addition of water in use. Still more particularly, it relates to a process of utilizing ammonium chloride in the manufacture of these cements.

Magnesium oxychloride cements have advantages over Portland cements in that they possess particularly high tensile strengths, excellent resilience, rapid attainment of maximum strength, outstanding cementing properties for large proportions of diluents, adaptability to coloring and other decorative effects. The diluents may be asbestos wood fibre, sawdust, leather scrap, crushed stone, sand, corkdust and the like. The products are useful as flooring, ship decking, stucco and other surfaces in buses, restaurants, stores, factories, schools, hospitals and other buildings.

Ordinary magnesium oxychloride cements, however, require the shipment and handling of at least two separate components, powdered magnesium oxide, and magnesium chloride either as an 18–22° Baumé solution or as crystals to be dissolved in water to form the solution. The ingredients cannot be premixed in the form of a powder because the mix sets up to an unworkable mass by moisture absorption. They must be shipped therefore in separate and dissimilar containers to the point of use. Loss of either component, misdirected shipments, leakage or spillage of the solution, dilution, or concentration of exposed magnesium chloride solutions and other factors, make the use of these cements difficult and frequently impractical. Uniform and satisfactory results can only be obtained by using the proper proportions of magnesium oxide and magnesium chloride solution, which is difficult to control and beyond the customary skill and equipment of ordinary construction labor.

Application Serial No. 191,489 filed October 21, 1950, by Jonas Kamlet discloses the successful production of a stable unitary magnesium oxychloride cement composition in solid comminuted form which consists essentially of magnesium oxide and combined hydrogen chloride, which is substantially without free magnesium chloride content and which sets up upon water wetting. The particular mode of production described is based upon the addition of hydrogen chloride as a gas to solid magnesium oxide. I have discovered that solid ammonium chloride can be reacted with solid magnesium oxide by heating to greater than about 220° C. but below about 400° C. The product probably contains true magnesium oxychloride in form having particular value as a stable unitary cement composition, but more certainly comprises a combination of magnesium oxide and hydrogen chloride. The ammonia values of the ammonium chloride are released and may be readily recovered without difficult problems of gas separation and corrosion. Advantageously ammonia removal is assisted by passing an inert gas such as air through the reaction zone. The desired content of combined hydrogen chloride necessary for stable unitary cement compositions is advantageously obtained by production of a concentrated reaction mixture and adjustment through admixture of additional magnesium oxide. The finished composition sets up after admixture with water to form a paste into a hard, stone-like mass of excellent qualities as a cement.

My invention has particular value in an integrated operation with the conventional ammonia-soda process in which sodium bicarbonate is produced by precipitation from ammoniated and carbonated brine, and ammonium chloride is left in the waste liquors. By application of my invention the hydrogen chloride values charged to the ammonia soda process which are usually discarded in the form of calcium chloride when ammonia is recovered from waste ammonium chloride solutions are economically recovered by conversion to useful and valuable form. As noted above, the ammonia is recovered for return to the ammonia-soda process while utilizing the hydrogen chloride values contained in the salt. In comparison to treatment of magnesium oxide with hydrogen chloride, generation of hydrogen chloride or its recovery and purification from organic chlorinations is avoided. Furthermore, the ammonium chloride process has the advantage of simplicity and ease of materials handling in that solid ammonium chloride may be charged to the reactor along with solid magnesium oxide.

I have found it advantageous to use a sufficient proportion of ammonium chloride so that the final composition may be adjusted by blending with magnesium oxide. The final composition should be equivalent to 8–34% combined HCl, 13–15% being particularly advantageous. It is highly desirable to prepare a concentrated reaction mixture, but the use of more than one mole of ammonium chloride per mole of available magnesium oxide should be avoided because of possible formation of free magnesium chloride.

Alternatively, however, the amount of ammonium chloride charged to the process can be controlled to produce the desired proportion of combined hydrogen chloride in the product. However, the capacity of the equipment is wasted and the products made by employing larger proportions of ammonium chloride and subsequently blending back with magnesium oxide may be superior in terms of the strength and strength retention of the ultimate cements in use.

The magnesium oxide should be in a form suitable for reaction and preferably should be a freshly calcined and finely divided magnesia. The magnesium oxide advantageously is of about 60- to 200-mesh fineness. Optimum results are obtained with magnesium oxide of which 85 per cent passes a 200-mesh screen but coarser material may be used.

I find that temperatures of at least 220° C. are required in order to effect reaction to a satisfactory extent but the evolution of ammonia is more complete at about 350° C. Temperatures of 400° C. or higher result in the loss of ammonium chloride by sublimation without reaction and are also less desirable because they favor decomposition of the desired true magnesium oxychloride product.

In carrying out the reaction, I prefer to introduce an inert gas to carry out the ammonia as formed. For this purpose I may employ air or nitrogen, but preferably use steam. The latter serves to delay the dehydration of the magnesia and to facilitate the removal of ammonia. In addition, there is evidence that steam may promote the reaction, for thoroughly dried magnesia does not appear to react readily with ammonium chloride. Air may be used, however, particularly at the lower temperatures. The ammonia is conveniently recovered from the purge gases by the usual condensing and water absorption system.

A rotating kiln or cylindrical reactor is convenient apparatus to use in the contacting and washing operation, particularly if it is arranged to tumble the finely divided solids while heating. The reactants and the purge gas then may be continuously charged to and withdrawn from the kiln in a balanced operation. The reaction product may be mixed with additional magnesium oxide near the discharge end of the reaction kiln or in separate mixing equipment.

The products of my invention are suitable for forming completely pre-mixed packaged cement compositions by admixture with the usual fillers, additives, or aggregates. For example, 3 to 10 per cent of finely divided copper powder, cuprous oxide or cupric oxide may be added with particular advantage to obtain a cement which is repellent to crawling insects and particularly suited for the construction of floors in hospitals, gymnasiums, restaurants and the like. These cements also have improved resistance to water and weathering, reduced tendency to expand and an improved tolerance for lime.

The following examples are illustrative only of the operating procedure, conditions and nature of the materials employed and products produced.

*Example I*

A rotating glass reactor containing horizontal ribs for the agitation of the charge was charged with 60 grams of finely ground calcined magnesite and 27.4 grams of ammonium chloride. These components were admixed in the reactor and heated for two hours at about 220° C. Superheated steam at a temperature of 270° C. was passed through the reactor during the second hour. On cooling, the product showed a chloride content calculated as combined HCl corresponding to about 22.72 per cent.

53.5 grams of this product was admixed with 30.8 grams of fresh calcined magnesite and 0.01 gram of sodium stearate as a wetting agent. The combined hydrogen chloride content of the final composition was 14.84 per cent.

For the measurement of transverse strength of the cement a test piece was prepared by mixing about 2 grams of water with 5 grams of the powder until a plastic mass was obtained which could be worked into molds, eliminating bubbles as far as possible. The molds yielded a test piece ¼ x ¼ x 5″. The wet casting was allowed to dry for 24 hours before testing. The transverse strength of the test piece was 1320 pounds per square inch. The addition of sodium stearate is desirable to increase the rate of wetting of the powder when it is admixed with water for the purpose of casting.

*Example II*

A reaction mixture of 45.2 grams of ammonium chloride and 169.2 grams of finely ground calcined magnesite was prepared and 70 grams of the mixture was charged to the rotary reactor described in the preceding example. A slow stream of preheated nitrogen was passed through the apparatus and the charge was maintained at a temperature of about 150° C. The addition of a small stream of steam served to accelerate the ammonia evolution. After two hours no ammonia could be detected in the exit gases and the mixture was cooled and analyzed. It contained 57.04 per cent MgO and 15.90 per cent of combined hydrogen chloride. A test bar, prepared and tested for transverse strength, maintained 2150 pounds per square inch.

*Example III*

70 grams of the product initially prepared in the preceding example was charged to the reactor suitably arranged for the introduction of superheated steam. The contents of the reactor were raised to about 300° C. and superheated steam at about 260–270° was introduced. During the following half hour the contents of the flask were usually at a temperature of about 350° C. and ammonia was copiously evolved. The reaction appeared to be complete in one-half hour and the heating was discontinued. A test bar, prepared and broken as previously described, had a transverse strength of 1345 pounds per square inch.

*Example IV*

Heating a portion of the original product prepared for Example II in an Erlenmeyer flask covered with a watch glass for about ten minutes at 350° C. showed no residual ammonia, and a combined hydrogen chloride content corresponding to 15.18 per cent. Test bars of this product sustained a load corresponding to a transverse strength of 1840 pounds per square inch.

*Example V*

A sample of the same product as prepared originally for Example II was heated in the rotary reactor for ten minutes at 330–350° C. but no steam was introduced. Test bars sustained loads corresponding to an average transverse strength of about 2050 pounds per square inch.

*Example VI*

70 grams of the same product was heated in the rotary reactor for 15 minutes at 350–370° C.

and for another 15 minutes at 370–400° C. The MgO content averaged 56.62 per cent and the combined hydrogen chloride content was equivalent to 16.07 per cent. Test bars sustained loads corresponding to an average transverse strength of 1583 pounds per square inch.

*Example VII*

A mixture of 43 grams of finely ground calcined magnesite and 28 grams of ammonium chloride was heated for one-half hour at 370–400° C. in the rotary reactor. 20 grams of additional magnesite was added to the mixture and reheated. More ammonia was evolved but after the heating, no residual ammonia remained in the product. The MgO content was 43.95 per cent and the combined hydrogen chloride content was equivalent to 25.05 per cent. Two test bars sustained loads corresponding to an average transverse strength of 1545 pounds per square inch.

*Example VIII*

To 35 grams of the product of Example VII was added 22.2 grams of fresh finely ground calcined magnesite and the composition was thoroughly mixed. The MgO content was thus increased to 55.12 per cent and the hydrogen chloride content reduced to an equivalent of 15.44 per cent. Test bars supported loads corresponding to an average transverse strength of 1660 pounds per square inch.

I claim:

1. A process for the manufacture of a stable unitary magnesium oxychloride cement composition which comprises mixing solid magnesium oxide with solid ammonium chloride, the proportion of magnesium oxide being in excess of one mole per mole of ammonium chloride, heating to a temperature within the approximate ranges 220° to 400° C. and recovering the solid reaction product.

2. A process for the manufacture of a stable unitary magnesium oxychloride cement composition which comprises finely dividing magnesium oxide to about 60- to 200-mesh, mixing the solid comminuted magnesium oxide with solid ammonium chloride, the proportion of magnesium oxide being in excess of one mole per mole of ammonium chloride, heating to a temperature within the approximate range 220° to 400° C. while purging the reaction atmosphere with an inert gas, and recovering the solid reaction product.

3. The process of claim 2 in which the purge gas is steam.

4. A process for the manufacture of a stable unitary magnesium oxychloride cement composition which comprises mixing solid magnesium oxide with solid ammonium chloride, the magnesium oxide being present in excess of one mole per mole of ammonium chloride and sufficient to produce a reaction product concentrated in combined hydrogen chloride, while heating to a temperature within the approximate range 220° to 400° C., and admixing additional magnesium oxide with the concentrated reaction product to obtain a product consisting essentially of magnesium oxide and about 8 to about 34 per cent by weight combined hydrogen chloride.

5. A process for the manufacture of a stable unitary magnesium oxychloride cement composition which comprises finely dividing magnesium oxide to about 60- to 200-mesh, mixing the solid comminuted magnesium oxide with solid ammonium chloride, the magnesuim oxide being present in excess of one mole per mole of ammonium chloride and sufficient to produce a reaction product concentrated in combined hydrogen chloride, while heating to a temperature within the approximate range 220° to 400° C. and purging the reaction atmosphere with an inert gas, and admixing aditional magnesium oxide with the concentrated reaction mixture to obtain a product consisting essentially of magnesium oxide and about 8 to about 34 per cent by weight combined hydrogen chloride.

6. The process of claim 5 in which the purge gas is steam.

LYLE K. HERNDON.

REFERENCES CITED

The following references are of record in the file of this patent:

UNITED STATES PATENTS

| Number | Name | Date |
|---|---|---|
| 1,000,386 | Eggenhoffner | Aug. 15, 1911 |

FOREIGN PATENTS

| Number | Country | Date |
|---|---|---|
| 11,222 | Great Britain | of 1884 |